A. S. JOHNSON.
Treating Artificial Stone.
No. 200,064.  Patented Feb. 5, 1878.
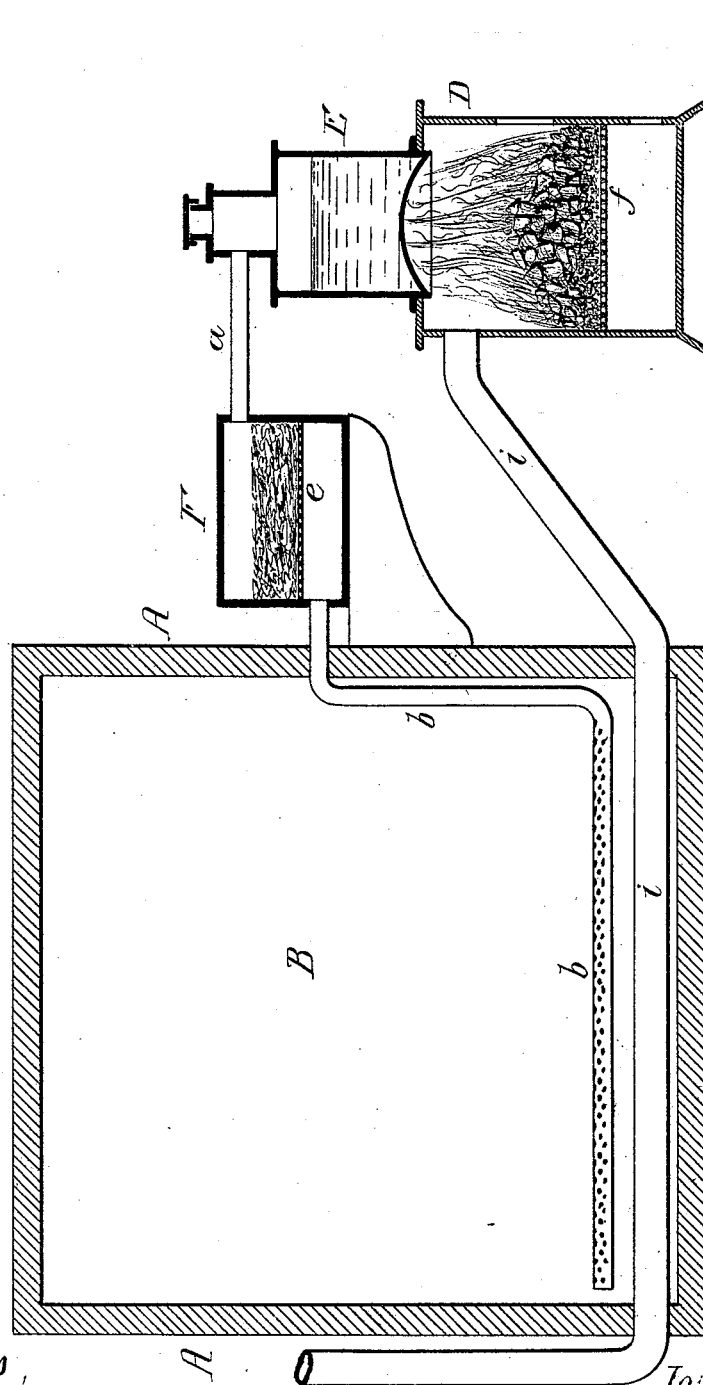
Witnesses
Harry A. Crawford
Harry Smith
Inventor
Alexander S. Johnson
by his Attorneys
Howson and Son

UNITED STATES PATENT OFFICE.

ALEXANDER S. JOHNSON, OF PHILADELPHIA, ASSIGNOR TO HIMSELF, EDWARD E. HEDLEY, AND T. FRANK TAYLOR, OF SAME PLACE, AND LYMAN GLEASON, OF HONESDALE, PENNSYLVANIA, AND J. J. GRANT, OF NEW YORK, N. Y.

IMPROVEMENT IN TREATING ARTIFICIAL STONE.

Specification forming part of Letters Patent No. 200,064, dated February 5, 1878; application filed December 5, 1877.

*To all whom it may concern:*

Be it known that I, ALEXANDER S. JOHNSON, of Philadelphia, Pennsylvania, have invented a new and useful Improvement in Treating Artificial Stone, of which the following is a specification:

The object of my invention is to so treat blocks of artificial stone of the character hereinafter described that they will be hardened, and the alkali in them so far neutralized that it will not injuriously affect the appearance of the stone. This object I attain in the following manner, reference being had to the accompanying drawing, the figure in which represents a sectional view of apparatus for carrying my invention into effect.

The artificial stone to the treatment of which my invention relates is composed of sand and cement in varying proportions, a composition of about two parts of fine sand and one part of Portland cement being preferred.

Molded blocks of this character, unless they are dried for a very long time, do not possess a sufficient degree of hardness for use, and they are objectionable, owing to the fact that, on the dried blocks being exposed, the alkali in the materials of which they are composed appears on the surface of the block in the form of disfiguring spots.

I have discovered that by subjecting blocks of artificial stone of the character described to the action of steam which has been caused to pass through a mass of granulated or powdered sulphur the stone will be rapidly hardened and the alkali neutralized to such an extent that the above objection will be entirely overcome.

In carrying out my invention I use a structure, A, of wood or other suitable material, and of any suitable size or shape, this structure inclosing a chamber, B, in which the blocks of artificial stone are placed after being molded in the usual manner.

Adjacent to this structure is a furnace, D, to an opening in the top of which is adapted the lower end of a vessel, E, containing water, a pipe, $a$, leading from the upper part of this vessel to the upper part of a box, F, intervening between the furnace D and structure A. From the lower portion of this box F extends a pipe, $b$, which passess into the chamber B, that portion of the pipe within said chamber being perforated, as shown. Within the box, at a point above the pipe $b$ and below the pipe $a$, is arranged a partition, $e$, on which is deposited sulphur, either in a granulated or powdered form.

The furnace D has the usual feed and ash-pit openings and a grate, $f$, the products of combustion passing from the furnace through a pipe, $i$, which is preferably carried through the chamber B near the bottom of the same, as shown.

When a fire is kindled in the furnace D the water in the vessel E is vaporized, the vapor passing through the pipe $a$ into the box F, through the mass of sulphur in the same, and into the pipe $b$, through the perforations of which it escapes into the chamber B.

The length of time during which the blocks are subjected to the action of the sulphureted vapor varies in accordance with the size of the block or the degree of hardness which it is desired to impart to the same.

Such a degree of heat is maintained in the chamber B, owing to the passage of the pipe $i$ through the same, that the condensation of the vapor in the chamber is prevented.

It is advisable, in some cases, in addition to treating the stone to the sulphur-bath, as above described, that a small quantity of sulphur be added to the ingredients composing the stone during the admixture of the same. I have produced good results by mixing one-twelfth of one part of sulphur to a composition containing two parts of sand and one of Portland cement. These proportions, however, may be varied.

I claim as my invention—

1. As an improvement in treating artificial-stone composition, the within-described method of subjecting the same to the action of steam which has previously passed through a mass of sulphur, all substantially as specified.

2. The combination of the structure A, furnace D, vessel E, and sulphur-box F with the pipes *a* and *b*, arranged substantially as specified.

In testimony whereof I have signed my name to this specification in the presence of two subscribing witnesses.

ALEXANDER S. JOHNSON.

Witnesses:
 LYMAN GLEASON,
 HARRY SMITH.